United States Patent
Kaite et al.

Patent Number: 5,808,442
Date of Patent: Sep. 15, 1998

[54] METHOD OF CHARGING A PLURALITY OF LITHIUM ION RECHARGEABLE BATTERIES

[75] Inventors: Osamu Kaite, Tsuna-gun; Toshiaki Okuyama, Mihara, both of Japan

[73] Assignee: Sanyo Electric Co., Ltd., Osaka, Japan

[21] Appl. No.: 724,230

[22] Filed: Sep. 27, 1996

[30] Foreign Application Priority Data

Sep. 29, 1995 [JP] Japan ................................. 7-253565

[51] Int. Cl.$^6$ ................................................. H01M 10/44
[52] U.S. Cl. ................................. 320/15; 320/16; 320/2; 320/39
[58] Field of Search ........................... 320/15, 16, 17, 320/6, 2, 39

[56] References Cited

U.S. PATENT DOCUMENTS

| | | | |
|---|---|---|---|
| 3,928,791 | 12/1975 | Mullersman | 320/15 |
| 4,081,738 | 3/1978 | Roller | 320/16 X |
| 4,313,078 | 1/1982 | Bilsky et al. | 320/15 |
| 4,387,332 | 6/1983 | Oyamada et al. | 320/15 |
| 4,849,682 | 7/1989 | Bauer et al. | 320/15 |
| 5,028,859 | 7/1991 | Johnson et al. | 320/15 |
| 5,057,762 | 10/1991 | Goedken et al. | 320/15 |
| 5,122,722 | 6/1992 | Goedken et al. | 320/15 |
| 5,438,250 | 8/1995 | Retzlaff | 320/17 |
| 5,497,066 | 3/1996 | Drouillard et al. | 320/15 X |
| 5,539,297 | 7/1996 | Fiebig | 320/15 |
| 5,548,200 | 8/1996 | Nor et al. | 320/2 X |
| 5,617,004 | 4/1997 | Kaneko | 320/15 |

FOREIGN PATENT DOCUMENTS 1-148030  6/1989  Japan.

*Primary Examiner*—Peter S. Wong
*Assistant Examiner*—K. Shin
*Attorney, Agent, or Firm*—Wenderoth, Lind & Ponack

[57] ABSTRACT

In the method of charging a plurality of lithium ion rechargeable batteries, if another battery is attached during battery charging, open circuit voltages of those respective batteries are measured and compared. When the open circuit voltage of the battery attached later is greater than that of the battery being charged, charging of the previously attached battery is suspended and the battery attached later is given priority and charged. When the open circuit voltage of the battery being charged is greater than that of the battery attached later, the battery being charged is given priority and charged.

9 Claims, 6 Drawing Sheets

METHOD OF CHARGING A PLURALITY OF LITHIUM ION RECHARGEABLE BATTERIES

BACKGROUND OF THE INVENTION

The present invention relates to a method of charging a plurality of lithium ion rechargeable batteries. In this application, the term lithium ion rechargeable battery is taken not only to mean a single battery, but rather is used with the broader meaning to include battery packs containing a plurality of lithium ion rechargeable batteries.

When charging a plurality of rechargeable batteries, it is important how fast the batteries can be fully charged. This is because the faster the batteries can be fully charged, the faster they can be used. To realize this objective, a method of charging rechargeable batteries starting from the battery with the most charge is cited in Japanese Non-examined Patent Publication No. 1-148030 issued Jun. 9, 1989. In this application, the noun "charge" is the amount of electrical energy capacity given to the battery by charging, which means the capacity available for discharge. The charging method disclosed in HEI 1-148030 determines, at the beginning, battery charge of a plurality of attached batteries and gives priority to batteries with high charge by charging them first. In other words, batteries with high remaining charge capacity, which can be rapidly recharged, are given priority and charged first. Consequently, this system has the characteristic that the attached batteries can be fully charged in the most rapid fashion.

However, although the charging method of HEI 1-148030 can speed up full charging of the first battery charged, it cannot reduce the total charging time of all the attached batteries. For example, if three rechargeable batteries with respective full charging times of 3 hrs, 3 hrs, and 2 hrs are attached, 8 hrs are required to charge all three batteries to full charge. Although the first rechargeable battery can be fully charged 2 hrs after attachment, the total full charging time for all batteries cannot be reduced below 8 hrs.

Further, if another rechargeable battery is attached after charging of a previously attached battery is in progress by the charging method of HEI 1-148030, minimum time full battery charging cannot be performed. This is because even if a rechargeable battery with more charge than one currently being charged is attached, the battery attached later with the most charge will not be given priority.

The present invention was developed to solve the above mentioned problems by fully charging a plurality of lithium ion rechargeable batteries in an ideal manner. It is thus a primary object of the present invention to present a method of charging a plurality of lithium ion rechargeable batteries that minimizes the time for fully charging the first battery charged when a plurality of batteries are attached simultaneously, or when some of the batteries are attached later.

It is another primary object of the present invention to present a method of charging a plurality of lithium ion rechargeable batteries that can reduce the total charging time of the plurality of batteries.

The above and further objects and features of the invention will more fully be apparent from the following detailed description with accompanying drawings.

SUMMARY OF THE INVENTION

The method of charging a plurality of lithium ion rechargeable batteries of the present invention is an improvement of a charging method that senses the voltage of the batteries to be charged and gives priority to charging those with a high amount of charge first. To prioritize batteries with high charge and charge them first, the plurality of lithium ion rechargeable batteries are compared in voltage with a reference voltage. Batteries with higher voltage than the reference are charged in a prescribed order. After that, batteries with lower voltage than the reference are charged in a prescribed order. Further, in the charging method of the present invention, when another lithium ion rechargeable battery is attached during battery charging, the charge of the battery being charged and the one attached later are sensed. If the battery which was attached later has a higher charge than the one being charged, it is given priority and charged before the previously attached battery being charged. If the previously attached battery being charged has a higher charge than the one attached later, it is given priority and charged before the battery attached later.

For example, in this charging method, when another lithium ion rechargeable battery is attached to the battery charger while a battery is being charged, battery charging is interrupted, and the charge of the battery being charged and the battery attached later are sensed and compared. Lithium ion rechargeable batteries have the property that their open circuit voltage is high when their charge is high. Consequently, the battery charge of a lithium ion rechargeable battery can be sensed by measuring its open circuit voltage. If the open circuit voltage of the battery attached later is higher than the open circuit voltage of the battery being charged, the charge of the battery attached later is greater than the charge of the battery being charged. In other words, the battery attached later can be fully charged in a shorter time than the battery being charged and is given priority. When the open circuit voltage of the battery being charged is greater than the open circuit voltage of the battery attached later, the charge of the battery being charged is greater than the charge of the battery attached later. In this case, priority is not given to the battery attached later, but rather to the battery being charged, for which charging is continued. As a result, the minimum time to full charge is not lengthened even when a battery with low charge is attached after charging has begun. This is because this charging method measures and compares the charge of the battery being charged with batteries attached later and charges the battery with the highest charge first.

Further, the charging method of the present invention can charge lithium ion rechargeable batteries in a sequence other than consecutively charging each battery to full charge. To reduce the total time to fully charge a plurality of lithium ion rechargeable batteries, each battery can be charged to a prescribed level short of full charge. Subsequently all batteries can be connected in parallel for simultaneous constant current and constant voltage charging to full charge.

In this charging method, lithium ion rechargeable batteries are not charged to full charge one after another. For example, when a battery has been charged to 80% of full charge, charging is temporarily interrupted and the next battery is charged, again to 80% of full charge. After all lithium ion rechargeable batteries have been charged to 80% of full charge, all the batteries are connected in parallel and charged with constant current and constant voltage. In the same manner as for nickel-cadmium batteries, lithium ion rechargeable batteries are not charged to full charge by constant current charging. As full charge is approached, charging current is decreased to prevent battery voltage from becoming abnormally high. This is done because if battery voltage rises abnormally high, battery performance is markedly degraded. However, charging current reduction as full charge is approached lengthens the time to full charge. Since battery charge increase is proportional to the charging current, the rate of increase in charge decreases as the charging current is reduced.

The time duration of the low current charging step, which charges a lithium ion rechargeable battery by gradually decreasing charging current as full charge is approached, cannot be reduced. Consequently, in prior art charging methods which sequentially charge each battery to full charge in order of highest to lowest charge, the time to full charge required by the low current charging step for each battery cannot be reduced. As a result, the total time to full charge for prior art charging of a plurality of lithium ion rechargeable batteries becomes quite long. On the other hand, the charging method of the present invention charges each lithium ion rechargeable battery to a prescribed charge and then connects all batteries in parallel for full charging. Regardless of the fact that a plurality of batteries must be fully charged, the low current charging step, which is necessarily long because current is reduced, is performed as one single step to drastically reduce total charging time. For example, consider charging three lithium ion rechargeable batteries, each with a 1 hr low current charging step. In this case, prior art charging methods require a total of 3 hrs of low current charging, while the charging method of the present invention can reduce that to 1 hr.

Further, even though this charging method connects a plurality of batteries in parallel and charges them simultaneously, there is no need to use a high capacity battery charger. This is because the lithium ion rechargeable batteries connected in parallel are near full charge and the charging current is therefore small. Even though the batteries are connected in parallel, the total charging current does not become very large.

In the charging method of the present invention, when any of the lithium ion rechargeable batteries have a voltage greater than the reference voltage, those batteries are given priority and charged first. When all the battery voltages are less than the reference voltage or all the battery voltages are greater than the reference voltage, all the batteries are connected in parallel and fully charged by constant current and constant voltage charging.

In this charging method, when any single lithium ion rechargeable battery has a charge greater than the reference charge, it is given priority and charged first. However, when all the batteries attached to the charger have less charge than the reference charge or all have more charge than the reference charge, all the batteries are connected in parallel and fully charged by constant current and constant voltage charging. In particular, when low charge lithium ion rechargeable batteries are connected in parallel and charged simultaneously, constant current charging can be lengthened, as shown in FIG. 1, to reduce overall charging time. In this case, since a plurality of batteries are connected in parallel and charged with constant current, the current for constant current charging is reduced and more time is required to reach the voltage for constant voltage charging. This allows efficient charging. Since constant current charging time is increased, constant voltage charging time, where charging current is gradually decreased, can be reduced to make the overall charging time shorter. Finally, when all of the lithium ion rechargeable batteries have a charge greater than the reference charge, they can be connected in parallel and quickly charged to full charge.

DETAILED DESCRIPTION OF THE INVENTION

Figure 2:
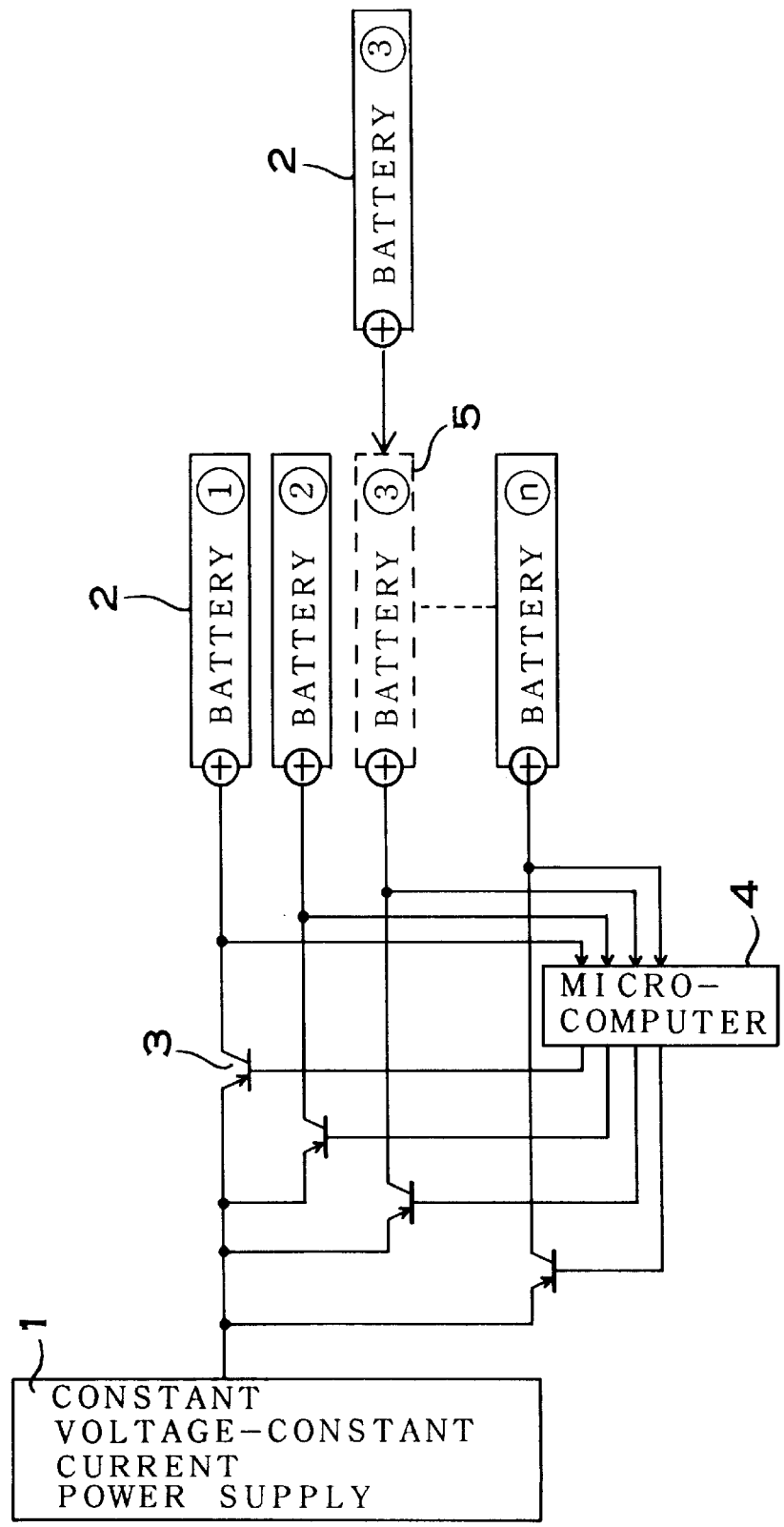
FIG. 2 is a circuit diagram showing a charging circuit used for the method of charging a plurality of lithium ion rechargeable batteries of the present invention.

Turning to FIG. 2, a charging circuit for the method of charging a plurality of lithium ion rechargeable batteries of the present invention is shown. The circuit of this figure is provided with a constant voltage-constant current power supply 1 to convert commercial Alternating Current (AC) to charging voltage and current for the lithium ion rechargeable batteries 2, switching devices 3 to connect the constant voltage-constant current power supply 1 to attached lithium ion rechargeable batteries 2, and a micro-computer 4 to determine battery voltage and control the switching devices 3. When a switching device 3 is on, the lithium ion rechargeable battery 2 connected through that switching device 3 to the constant voltage-constant current power supply 1 is charged. When a switching device 3 is off, the battery 2 connected through that switching device 3 is not charged.

The micro-computer 4 fully charges a plurality of lithium ion rechargeable batteries 2 by controlling the switching devices 3 as follows. The order of charging batteries 2 attached to the battery charger attachment sections 5 is established in the micro-computer 4 memory. The battery charger is provided with a plurality of attachment sections 5 to accommodate consecutive charging of a plurality of lithium ion rechargeable batteries 2. When a battery 2 is attached to an attachment section 5, the terminals of the battery 2 are connected through contacts to a switching device 3. Consequently, a battery 2 connected to a switching device 3, which is on, is charged. For example, if a battery charger is provided with attachment sections 1, 2, 3, 4, . . . n for attaching a plurality of lithium ion rechargeable batteries 2, the order for charging attached batteries may be established in micro-computer 4 memory in the order of the attachment sections 1, 2, 3, 4, . . . n.

However, the order in which lithium ion rechargeable batteries 2 are charged is not always according to an order permanently in micro-computer memory. Prior to the start of charging, the charge of each battery attached to the battery charger attachment sections is compared to a reference charge. Lithium ion rechargeable batteries with charge greater than the reference charge are given priority and fully charged according to a sequential order stored in micro-computer memory. Batteries with charge less than the reference charge are charged according to a sequential order stored in memory after completion of charging for batteries with high charge.

Further, when a lithium ion rechargeable battery is attached later during charging of a previously attached battery, the micro-computer compares the charge of the previously attached battery being charged with the charge of the battery attached later and determines the charging order. The charge of the lithium ion rechargeable battery being charged can be determined from its open circuit voltage. Open circuit voltage is measured by temporarily turning the switching device off to interrupt charging. The charge of the battery attached later can similarly be determined by measuring its open circuit voltage. Again the open circuit voltage is measured while the battery is not being charged. The charge of each battery is then compared and the battery with the highest charge is charged first. Therefore, when the charge of the battery being charged is greater than the charge of the battery attached later, the battery being charged is charged to full charge first. However, when the charge of the battery attached later is greater than the charge of the battery being charged, the battery attached later is given priority over the battery being charged and is charged to full charge.

To compare battery charge with the reference charge, the open circuit battery voltage is measured and compared to the reference voltage. The reference voltage for open circuit battery voltage comparison is set, for example, to 3.90 V/cell. When a battery pack with two lithium ion rechargeable batteries connected in series is charged, the reference voltage is twice that value or 7.80 V. Similarly, a battery pack containing N lithium ion rechargeable batteries is compared to a reference voltage of N×3.90 V. A battery pack with a voltage greater than this reference voltage has a charge greater than the reference charge and is given priority and charged to full charge. However, the reference voltage for comparing battery charge in the present invention is not restricted to 3.90 V/cell. The reference voltage may also be set to an optimum voltage in the range from 3.80 V/cell to 3.95 V/cell.

Figure 3:
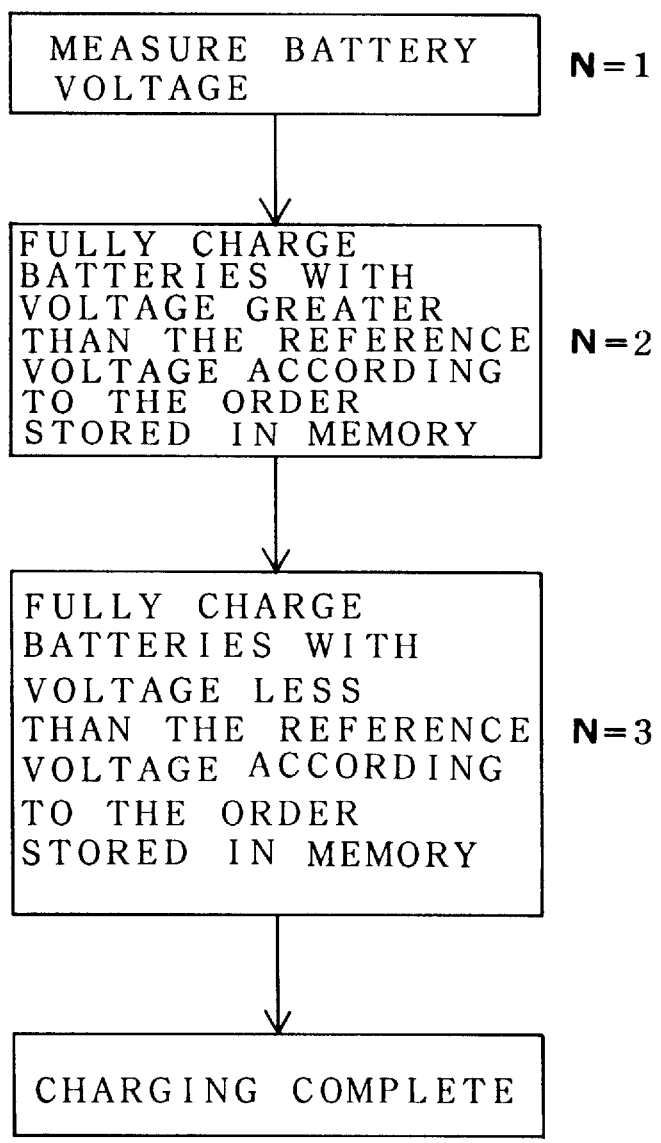
FIG. 3 is a flow-chart showing a procedure for fully charging a plurality of lithium ion rechargeable batteries in an embodiment of the present invention.

This charging method fully charges a plurality of lithium ion rechargeable batteries by the steps shown in FIG. 3.

[Step N=1]

Battery charge of lithium ion rechargeable batteries attached to attachment sections is sensed by measuring open circuit voltage.

[Step N=2]

Lithium ion rechargeable batteries with open circuit voltage greater than the reference voltage, in other words batteries with higher charge than the reference charge, are constant current and constant voltage charged to full charge according to the sequential order in micro-computer memory.

[Step N=3]

Batteries with open circuit voltage lower than the reference voltage, in other words batteries with less charge than the reference charge, are constant current and constant voltage charged to full charge according to the sequential order in micro-computer memory.

In steps N=2 and N=3, batteries attached later are sensed for at regular intervals. If a battery is attached to an attachment section, battery voltage suddenly rises from 0 V. For example, if a previous voltage measurement is 0 V and the next measurement is more than 2 V, it is judged that a battery has been attached later.

When a battery is attached later, the open circuit voltage of that battery is measured to determine its charge, and charging is interrupted to measure the open circuit voltage of the battery being charged to determine its charge as well. The open circuit voltage of the battery being charged and the open circuit voltage of the battery attached later are compared to compare the charge of both batteries. When the open circuit voltage of the battery attached later is greater than that of the battery being charged, or in other words when the charge of the battery attached later is greater than that of the battery being charged, the battery attached later is given priority and charged to full charge. The battery that was being charged is charged after the battery attached later has been fully charged. When the open circuit voltage of the battery attached later is less than that of the battery being charged, or in other words when the charge of the battery attached later is lower than that of the battery being charged, charging of the battery that was being charged is re-started to continue its charging.

The open circuit voltage of the battery attached later, which is not given priority over the battery being charged, is compared to the reference voltage to compare its charge with the reference charge. If the battery voltage is greater than the reference voltage, battery charge is assumed to be greater than the reference charge and that battery is added to the group of remaining high charge batteries. The battery is fully charged with constant current and constant voltage according to the order stored in micro-computer memory for the high charge group. If the battery voltage is less than the reference voltage, battery charge is assumed to be lower than the reference charge and that battery is added to the group of remaining low charge batteries. The battery is fully charged with constant current and constant voltage according to the order stored in micro-computer memory for the low charge group.

Figure 4A:
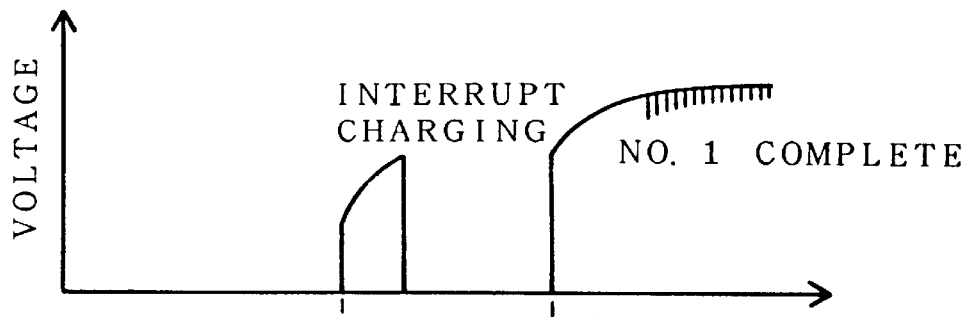
FIGS. 4A–C are graphs showing charging of three lithium ion rechargeable batteries by the charging method shown in FIG. 3.
Figure 4B:
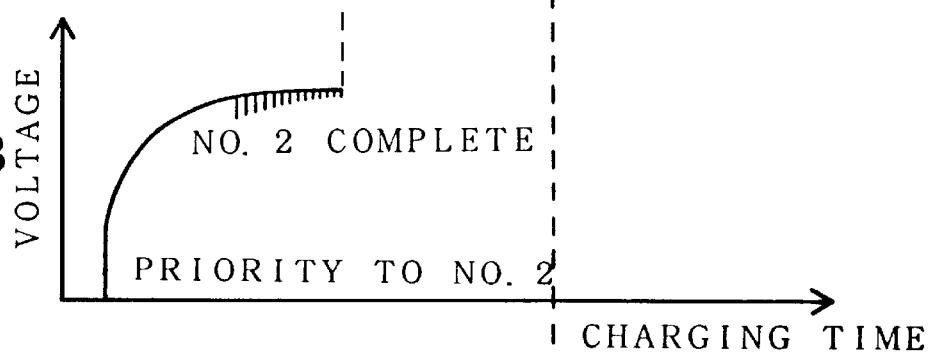
Figure 4C:
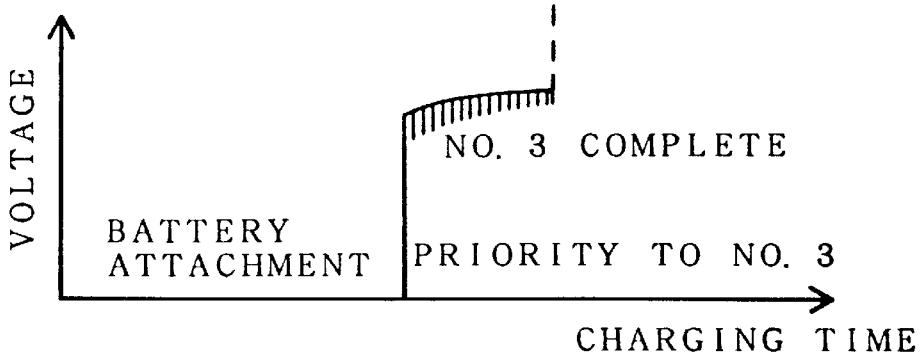

Turning to FIGS. 4A–C, graphs show charging of three lithium ion rechargeable batteries. In FIGS. 4A–C, batteries are initially attached to attachment sections A and B, and subsequently a battery is attached to attachment section C. Normally batteries would be charged according to attachment section from A to B. However, when the open circuit voltage of the battery in attachment section A is less than the reference voltage and the open circuit voltage of the battery in attachment section B is greater than the reference voltage, the charge of battery No. 2 is assumed greater than the charge of battery No. 1. In this case, as shown in FIG. 4B, battery No. 2 is given priority and charged to full charge. Subsequently, battery No. 1 is charged. If battery No. 3 is attached while battery No. 1 is being charged, the open circuit voltages of battery No. 1 and battery No. 3 are compared to determine the relative charge of the two batteries. If the open circuit voltage of battery No. 3 is greater than battery No. 1, the charge of battery No. 3 is judged greater than the charge of battery No. 1 and, as shown in FIG. 4C, battery No. 3 is given priority and fully charged. Charging of battery No. 1 is subsequently re-started and battery No. 1 is fully charged.

In the charging method of the present invention, batteries are checked for full charge by, for example, interrupting charging to measure open circuit voltage at periodic intervals. If the open circuit voltage has reached a set voltage, for example from 4.10 V/cell to 4.15 V/cell and preferably 4.13 V/cell, the battery is judged to be fully charged. Similarly, the difference between the voltage during charging and the open circuit voltage measured periodically by interrupting constant current and constant voltage charging can be measured. When this voltage difference becomes, for example from 20 mV/cell to 50 mV/cell and preferably 40 mV/cell, the battery may also be judged to be fully charged. Finally, when the current during constant current and constant voltage charging drops to or below a specified value, for example from 10 mA to 50 mA, the battery may also be judged to be fully charged.

The micro-computer may also control the switching devices to fully charge a plurality of lithium ion rechargeable batteries by the following steps. The order for charging batteries attached to attachment sections of the battery charger is stored in micro-computer memory. Prior to starting charging, the micro-computer compares the battery voltages of all the lithium ion rechargeable batteries attached to battery charger attachment sections to the reference voltage, for example 3.90 V/cell. Batteries with voltage greater than the reference voltage, in other words batteries with charge greater than the reference charge, are given priority and charged to a specified voltage according to the order stored in micro-computer memory. Batteries with voltage less than the reference voltage, in other words batteries with charge lower than the reference charge, are charged to a specified voltage according to the order stored in micro-computer memory after completion of charging for batteries with voltage greater than the reference voltage.

However, batteries with voltage greater than the reference voltage as well as batteries with voltage less than the reference voltage are not charged to full charge. For example, batteries are charged until their open circuit voltage rises to a specified voltage such as 4.05 V/cell. Again, charging is interrupted at periodic intervals to measure the open circuit voltage of batteries being charged.

After all batteries have been charged to the specified voltage, they are connected in parallel and charged to full charge. When open circuit battery voltage rises to 4.13 V/cell, for example, full charge is assumed and charging is terminated.

Figure 5:
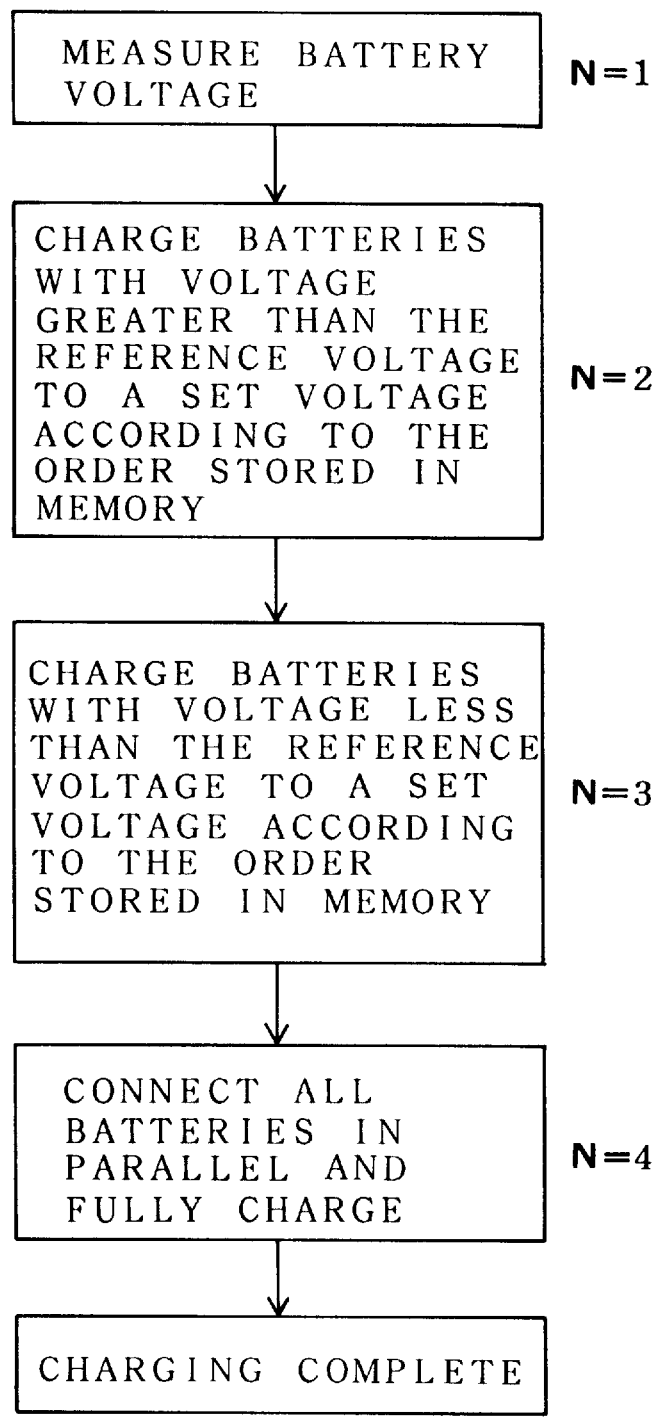
FIG. 5 is a flow-chart showing a procedure for fully charging a plurality of lithium ion rechargeable batteries in another embodiment of the present invention.

Turning to FIG. 5, the procedure for the above described lithium ion rechargeable battery charging method is shown.

Step N=1
Open circuit voltage of each battery attached to an attachment section is measured to determine battery charge.

Step N=2
Batteries with voltage greater than the reference voltage, in other words batteries with charge greater than the reference charge, are charged to the specified voltage according to the order stored in micro-computer memory.

Step N=3
Batteries with voltage less than the reference voltage, in other words batteries with charge lower than the reference charge, are charged to the specified voltage according to the order stored in micro-computer memory.

Step N=4
All batteries which have been charged to the specified voltage are connected in parallel and further charged by constant current and constant voltage charging until full charge is reached.

Figure 6A:
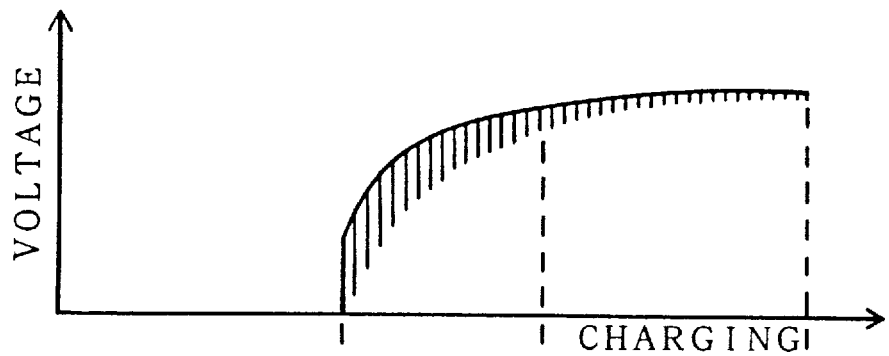
FIGS. 6A–C are graphs showing charging of three lithium ion rechargeable batteries by the charging method shown in FIG. 5.
Figure 6B:
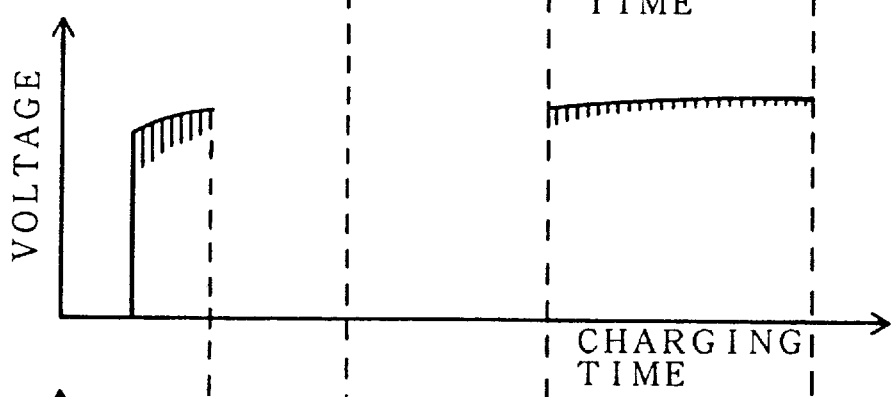
Figure 6C:
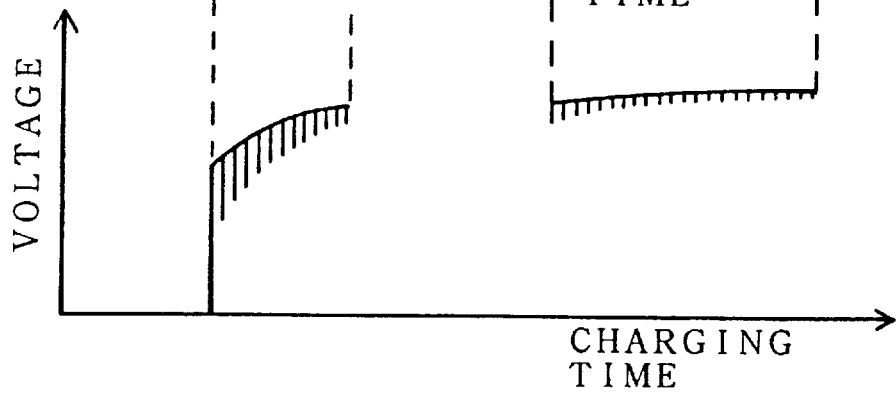

Turning to FIGS. 6A–C, again graphs show charging of three lithium ion rechargeable batteries. In FIGS. 6A–C, lithium ion rechargeable batteries are attached in attachment sections A, B, and C. These batteries would be charged in the attachment section order A, B, and C except that the open circuit voltage of battery A is less than the reference voltage and the open circuit voltage of batteries B and C are greater than the reference voltage. In this case, the charge of batteries B and C are judged to be greater than the reference charge and, as shown, are given priority and charged to the specified voltage. Battery A is subsequently charged to the specified voltage. When all batteries have been charged to the specified voltage, they are all connected in parallel and constant current and constant voltage charged to full charge. At periodic intervals charging is interrupted and open circuit voltage is measured to determine if the specified voltage has been reached or if full charge has been reached. When open circuit voltage reaches 4.05 V/cell or when the difference between the charging voltage and the open circuit voltage becomes 80 mV/cell, the specified voltage has been reached, charging is suspended, all batteries are connected in parallel, and charging is re-started. Subsequently when open circuit voltage rises to 4.13 V/cell or when the difference between the charging voltage and the open circuit voltage drops to or below 40 mV/cell, full charge is assumed and charging is terminated.

In the charging method where each battery is charged to the specified voltage of 4.05 V/cell and all batteries are subsequently charged in parallel to full charge, the charge of batteries attached during charging of a previously attached battery are compared to the charge of the battery being charged. Depending on battery charge, charging is accomplished as described below. Here, since battery charge is measured by open circuit voltage, high open circuit voltage is assumed to indicate high battery charge.

① The open circuit voltage of the battery attached later is greater than that of the battery being charged, and the open circuit voltage of the battery attached later is less than the specified voltage (for example, 4.05 V/cell) for parallel connection of all batteries.

In this case, the battery attached later is charged to the specified voltage (for example, 4.05 V/cell). Subsequently, the battery that was being charged during battery attachment is charged to the specified voltage. When all batteries have reached the specified voltage, they are connected in parallel and constant current and constant voltage charged to full charge.

② The open circuit voltage of the battery attached later is greater than that of the battery being charged, and the open circuit voltage of the battery attached later is greater than the specified voltage (for example, 4.05 V/cell) for parallel connection of all batteries.

In this case, there is no need to charge the battery attached later to the specified voltage. When all previously attached batteries have been charged to the specified voltage, the previously attached batteries and the battery attached later are connected in parallel and constant current and constant voltage charged to full charge.

③ The open circuit voltage of the battery attached later is less than that of the battery being charged, and the open circuit voltage of the battery attached later is less than the specified voltage (for example, 4.05 V/cell) for parallel connection of all batteries.

In this case, if all previously attached batteries have been charged to the specified voltage, the battery attached later is charged to the specified voltage. Subsequently, all batteries are connected in parallel and charged to full charge. If the previously attached batteries have not been charged to the specified voltage, previously attached batteries are charged to the specified voltage, and in sequential order the battery attached later is also charged to the specified voltage. Subsequently, the batteries are connected in parallel and charged to full charge.

④ The open circuit voltage of the battery attached later is less than that of the battery being charged, and the open circuit voltage of the battery attached later is greater than the specified voltage (for example, 4.05 V/cell) for parallel connection of all batteries.

In this case, all batteries have been charged to the specified voltage. Therefore, the battery attached later is connected in parallel with the batteries previously charged to the specified voltage and charged to full charge.

The lithium ion rechargeable battery charging method of the present invention also charges a plurality of batteries attached to the battery charger to full charge in the manner described below. In this charging method, the microcomputer controls the switching devices in the following manner to fully charge a plurality of lithium ion rechargeable batteries.

The order for charging batteries attached to attachment sections of the battery charger is stored in micro-computer memory. Prior to starting charging, the micro-computer compares the open circuit battery voltages of the lithium ion rechargeable batteries attached to battery charger attachment sections to the reference voltage, for example 3.90 V/cell, to compare battery charge with the reference charge. Any batteries with voltage greater than the reference voltage are assumed to have charge greater than the reference charge and are given priority and fully charged according to the order stored in micro-computer memory. Batteries with voltage less than the reference voltage are assumed to have charge lower than the reference charge and are fully charged according to the order stored in micro-computer memory after completion of charging for batteries with voltage greater than the reference voltage. When the charge of any battery is greater than the reference charge, full charging of all the batteries can be accomplished by methods described previously.

Figure 1:
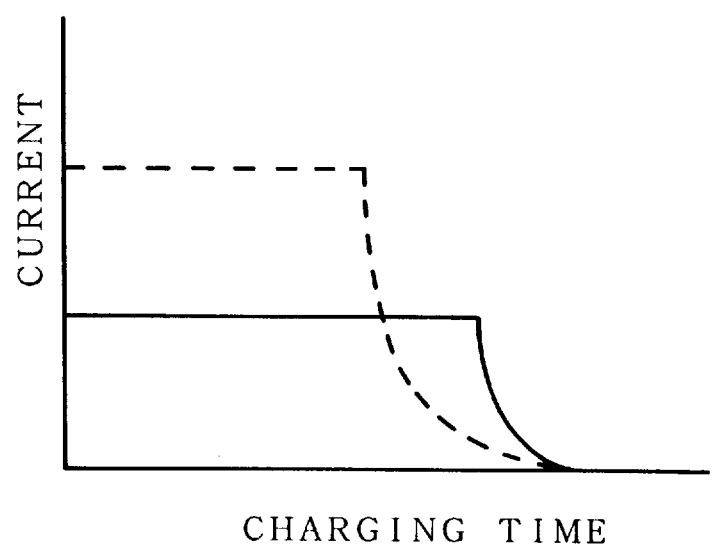
FIG. 1 is a graph showing full charging of a lithium ion rechargeable battery by constant current charging followed by constant voltage charging.

However, when the open circuit voltages of all the attached batteries are either greater than the reference voltage or less than the reference voltage, in other words when the charges of all the batteries are either greater than the reference charge or less than the reference charge, all the batteries are connected in parallel and constant current and constant voltage charged to full charge. As shown by the solid line in FIG. 1, the parallel connected lithium ion rechargeable batteries are initially charged by constant current and finally charged to full charge by constant voltage. The broken line in FIG. 1 shows the charging current for charging a single lithium ion rechargeable battery. The solid line shows the current flowing in either battery when two batteries are connected in parallel for full charging. As shown in FIG. 1, charging current during constant current charging is reduced for parallel connected lithium ion rechargeable batteries. For example, when two batteries are connected in parallel for charging, their charging current is reduced by ½.

Since charging current during constant current charging is reduced, constant current charging time becomes longer. Therefore, when a battery is constant current charged to a specified voltage and charging is subsequently switched to constant voltage, charging current drops rapidly and full charge is attained. This is because the battery is charged close to full charge during the constant current charging step.

When the open circuit voltages of all the attached batteries are greater than the reference voltage and the charges of all batteries are larger than the reference charge and almost fully charged, no constant current charging is performed and the batteries are fully charged by constant voltage charging.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A method of charging a plurality of lithium ion rechargeable batteries, which gives priority to charging batteries with a high amount of charge first, comprising the steps:

(1) when the amount of charge of any lithium ion rechargeable battery is greater than a reference charge, the battery with amount of charge greater than the reference charge is given priority and charged; and (2) when the amounts of charge of all lithium ion rechargeable batteries are less than the reference charge or the amounts of charge of all lithium ion rechargeable batteries are greater than the reference charge, all batteries are connected in parallel and charged by constant current and constant voltage charging.

2. A method of charging a plurality of lithium ion rechargeable batteries as recited in claim 1 wherein when the amounts of charge of some, but not all, lithium ion rechargeable batteries are greater than the reference charge, batteries with amounts of charge greater than the reference charge are charged in a predetermined order.

3. A method of charging a plurality of lithium ion rechargeable batteries as recited in claim 2 wherein when the open circuit voltages of some, but not all, lithium ion rechargeable batteries are greater than 3.80 V/cell to 3.95 V/cell, those batteries are charged in a predetermined order.

4. A method of charging a plurality of lithium ion rechargeable batteries, which gives priority to charging batteries with a high amount of charge first, characterized by the steps:

(1) a plurality of lithium ion rechargeable batteries are charged to a specified amount of charge but charging is suspended prior to reaching full charge; and (2) subsequently all batteries not fully charged are connected in parallel and simultaneously constant current and constant voltage charged to full charge.

5. A method of charging a plurality of lithium ion rechargeable batteries as recited in claim 4 wherein a plurality of lithium ion rechargeable batteries are charged until an open circuit voltage of 4.05 V/cell has been attained, and subsequently all batteries are connected in parallel and charged to full charge.

6. A method of charging a plurality of lithium ion rechargeable batteries, which gives priority to charging batteries with a high amount of charge first, comprising the steps of charging a plurality of lithium ion rechargeable batteries to a specified amount of charge but suspending charging prior to reaching full charge, subsequently connecting all batteries not fully charged in parallel, and simultaneously charging the batteries with constant current and constant voltage to full charge, wherein (1) if another lithium ion rechargeable battery is attached while a lithium ion rechargeable battery is being charged, the amount of charge of the battery being charged and the amount of charge of the battery attached later are compared, (2) when the amount of charge of the battery attached later is greater than that of the battery being charged, charging of the previously attached battery that was being charged is interrupted and the battery attached later is given priority and charged; and (3) when the amount of charge of the previously attached battery that was being charged is greater than that of the battery attached later, the previously attached battery that was being charged is given priority over the battery attached later and charged.

7. A method of charging a plurality of lithium ion rechargeable batteries as recited in claim 6 wherein a plurality of lithium ion rechargeable batteries are charged until an open circuit voltage of 4.05 V/cell has been attained, and subsequently all batteries are connected in parallel and charged to full charge.

8. A method of charging a plurality of lithium ion rechargeable batteries, which gives priority to charging batteries with a high amount of charge first, comprising the steps of measuring the amounts of charge of a plurality of lithium ion rechargeable batteries, comparing the amounts of charge with a reference charge, dividing the batteries into a group with amount of charge greater than the reference charge and a group with amount of charge less than the reference charge, charging batteries of the group with amount of charge greater than the reference charge to full charge in a predetermined order, and subsequently charging batteries of the group with amount of charge less than the reference charge to full charge in a predetermined order, wherein (1) if another lithium ion rechargeable battery is attached while a lithium ion rechargeable battery is being charged, the amount of charge of the battery being charged and the amount of charge of the battery attached later are compared, (2) when the amount of charge of the battery attached later is greater than that of the battery being charged, charging of the previously attached battery that was being charged is interrupted and the battery attached later is given priority and charged; and (3) when the amount of charge of the previously attached battery that was being charged is greater than that of the battery attached later, the previously attached battery that was being charged is given priority over the battery attached later and charged.

9. A method of charging a plurality of lithium ion rechargeable batteries as recited in claim 8 wherein the reference charge is an amount of charge corresponding to an open circuit battery voltage of 3.80 V/cell to 3.95 V/cell.

* * * * *